United States Patent [19]

Hoefkens et al.

[11] Patent Number: 4,862,449
[45] Date of Patent: Aug. 29, 1989

[54] ADJUSTABLE ECHO CANCELLER

[75] Inventors: Daniel S. G. Hoefkens, Antwerp; Joannes H. P. M. Spaenjers, Kalmthout; Eduard C. M. Boeykens, Hingene; Henri A. J. Verhille, Borgerhout; Gustaaf A. L. Geernaert, Antwerpen, all of Belgium

[73] Assignee: Alcatel N.V., Amsterdam, Netherlands

[21] Appl. No.: 120,848

[22] Filed: Nov. 16, 1987

[30] Foreign Application Priority Data

Nov. 17, 1986 [BE] Belgium ............................... 2/61088

[51] Int. Cl.⁴ .............................................. H04B 3/23
[52] U.S. Cl. ..................................... 370/32.1; 379/411
[58] Field of Search ............... 379/406, 410, 411, 399, 379/345; 370/32, 32.1

[56] References Cited

U.S. PATENT DOCUMENTS

| | | | |
|---|---|---|---|
| 3,632,905 | 1/1972 | Thomas et al. | 379/410 |
| 3,735,055 | 5/1973 | Thomas | 379/410 |
| 4,527,020 | 7/1985 | Ito | 379/410 |
| 4,578,544 | 3/1986 | Colin de Verdiere et al. | 379/410 |
| 4,605,826 | 8/1986 | Kanemasa | 370/32.1 |
| 4,610,018 | 9/1986 | Rabaey et al. | 375/25 |
| 4,688,211 | 8/1987 | Van Simaeys et al. | 370/58 |
| 4,717,848 | 1/1988 | Rabaey et al. | 307/549 |

FOREIGN PATENT DOCUMENTS

| | | |
|---|---|---|
| 0122594 | 10/1984 | European Pat. Off. |
| 0199420 | 10/1986 | European Pat. Off. |
| 3208214 | 9/1983 | Fed. Rep. of Germany |
| 58-204633 | 3/1984 | Japan |
| 8501404 | 3/1985 | World Int. Prop. O. |

OTHER PUBLICATIONS

Kamatake, "Fast Start-Up of a an Echo Canceller in a 2-Wire Full-Duplex Modem", IEEE Intl. Conf. on Communications ICC '84, May 1984, vol. 1, pp. 360-364.

Copperi et al, "A New Approach for a Icroprogrammed Echo Canceller", Fifth Intl. Conf. on Digital Satellite Communications, Mar. 1981, pp. 259-264.

Tachibana et al, "A Fast-Converging Equalizer Algorthm for Digital Communication", NEC Research and Development, Jan. 1973, No. 28, pp. 100-109.

Defraeye et al, "A 3-m$\mu$m CMOS Digital Codec . . . ", IEEE Journal of Solid State Circuits, vol. SC-20, Jun. 1985, No. 3, pp. 679-687.

Primary Examiner—Jin F. Ng
Assistant Examiner—Randall S. Vaas
Attorney, Agent, or Firm—Christie, Parker & Hale

[57] ABSTRACT

An echo canceller determines the optimum value of the required digital filter coefficient from values obtained by measuring a plurality of samples of the echo signal and by measuring, for each of a predetermined number of such samples, the replica signal sample factors which, when multiplied by the filter coefficients and summed, cancel the echo signal sample. The echo signal samples as well as the factors used to determine the replica signal samples are both measured in a way that reflects the actual environment in which the echo canceller is used. To measure each of the factors of the replica signal sample corresponding to an echo signal sample, an input signal is applied to the receive path, the filter coefficient corresponding to the factor is set to a non-zero value and the other filter coefficients to zero, and the resultant replica signal sample is then measured. It is not necessary for the echo signal and replica signal measurement to be made concurrently, or from the same location.

10 Claims, 4 Drawing Sheets

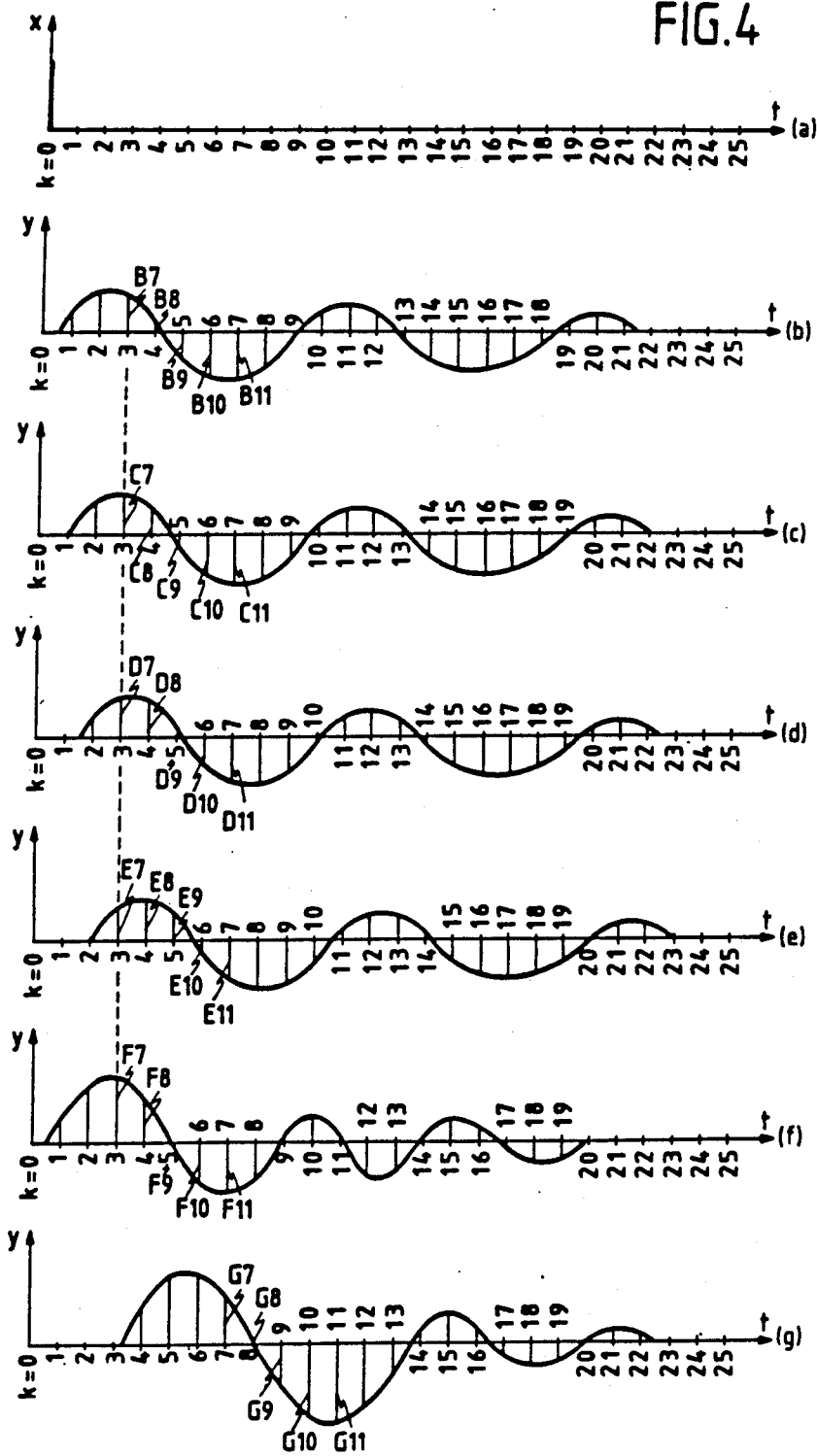

ADJUSTABLE ECHO CANCELLER

TECHNICAL FIELD The present invention relates to an adjustable echo canceller coupled between a receive path and a transmit path of a transmitter/receiver.

BACKGROUND ART A prior art echo canceller (the "digital hybrid") is disclosed in the article "A 3-$\mu$m CMOS Digital Codec with Programmable Echo Cancellation and Gain Setting" by P. Defraeye et al, published in the IEEE Journal of Solid-State Circuits, Vol. SC-20, No. 3, June, 1985, pp. 679–687.

The prior art digital hybrid is designed to be coupled between a receive path and a transmit path of a transmitter/receiver equipment and includes a digital filter producing a replica signal of an echo signal and a subtracter circuit to subtract said replica signal from said echo signal which appears on said transmit path in response to an input signal applied to said receive path. The input, echo and replica signals are sampled digital signals and each replica signal sample is the sum of individual terms each constituted by the product of a digital filter coefficient and of a factor which is function of said input signal.

The above-cited article gives no information about how the coefficients of the filter included in the echo canceller are determined. If the echo canceller is adaptive, the filter coefficients may be calculated as described in commonly assigned Belgian Pat. No. 896,089 (B. Aschrafi 1-20 corresponding to laid open German patent application DE No. 32 08 214). However, such calculations necessitate the use of additional relative complex circuits coupled to the transmitter/receiver equipment. In some cases, the additional complexity and expense is not considered justified. An alternative possible solution is to calculate a fixed set of filter coefficients in such a way that the digital filter wherein they are used provides a replica signal which satisfactorily cancels the echo signal under certain predetermined conditions, e.g., when forming part of telecommunication system, the line used in the transmitter/receiver equipment has a length within a predetermined range of line lengths. Obviously, that alternative solution is not satisfactory when the line length is not within the predetermined range, which can be the case in practice.

DISCLOSURE OF INVENTION

An object of the present invention is to provide an echo canceller which is adapted to determine the optimum value of said filter coefficients in a relatively simple way. That object is achieved in the present echo canceller by including processing means for determining the filter coefficients from values obtained by measuring a plurality of samples of said echo signal and by measuring for a predetermined number of such echo signal samples the replica signal sample factors which, when multiplied by the filter coefficients and summed, cancel the echo signal sample.

Because the echo signal samples as well as the factors used to determine the replica signal samples are both measured in a way that reflects the actual environment wherein the echo canceller is used, the filter coefficients which are determined by using those measured values are relatively accurate.

Another characteristic feature of the present echo canceller is that, to measure each of the factors of the replica signal sample corresponding to an echo signal sample, the processing means applies an input signal to the receive path, successively sets the filter coefficient corresponding to the factor equal to a nonzero value and the other filter coefficients to zero, and measures the then obtained replica signal sample which constitutes the factor. In this way, the individual contribution of each of the filter coefficients to the replica signal sample is known and the factors used to determine the replica signal are measured in a relatively simple manner.

Still another characteristic feature of the present echo canceller is that the processing means is able to perform at least the measurements of the echo signal samples from a location which is common for a plurality of the transmitter/receiver equipment. In this way, the processing means may be used in common for a plurality of echo cancelers so that the filter coefficients of these echo cancelers may be determined by making use of a minimum amount of equipment. Moreover, any possible update of the processing means has to be performed only once and not for each transmitter/receiver equipment.

Still another characteristic feature of the present echo canceller is that the processing means is able to perform the measurements of the replica signal factors in the transmitter/receiver equipment. In this way, the accuracy of the measurements of these factors is relatively very high because it is not affected by unwanted interfering signals.

In accordance with the method aspects of the present invention, the coefficients of such a digital filter are determined by measuring a plurality of samples of the echo signal, measuring for each echo signal sample the factors of the replica signal sample, and determining the filter coefficients from the values obtained by the measurements.

BRIEF DESCRIPTION OF DRAWINGS

The above mentioned and other objects and features of the invention will become more apparent and the invention itself will be best understood by referring to the following description of a presently preferred embodiment taken in conjunction with the accompanying drawings wherein:

FIGS. 4(a) to 4(g) represent various signals waveforms used to illustrate the operation of the echo canceller.

BEST MODE FOR CARRYING OUT THE INVENTION

Figure 1:
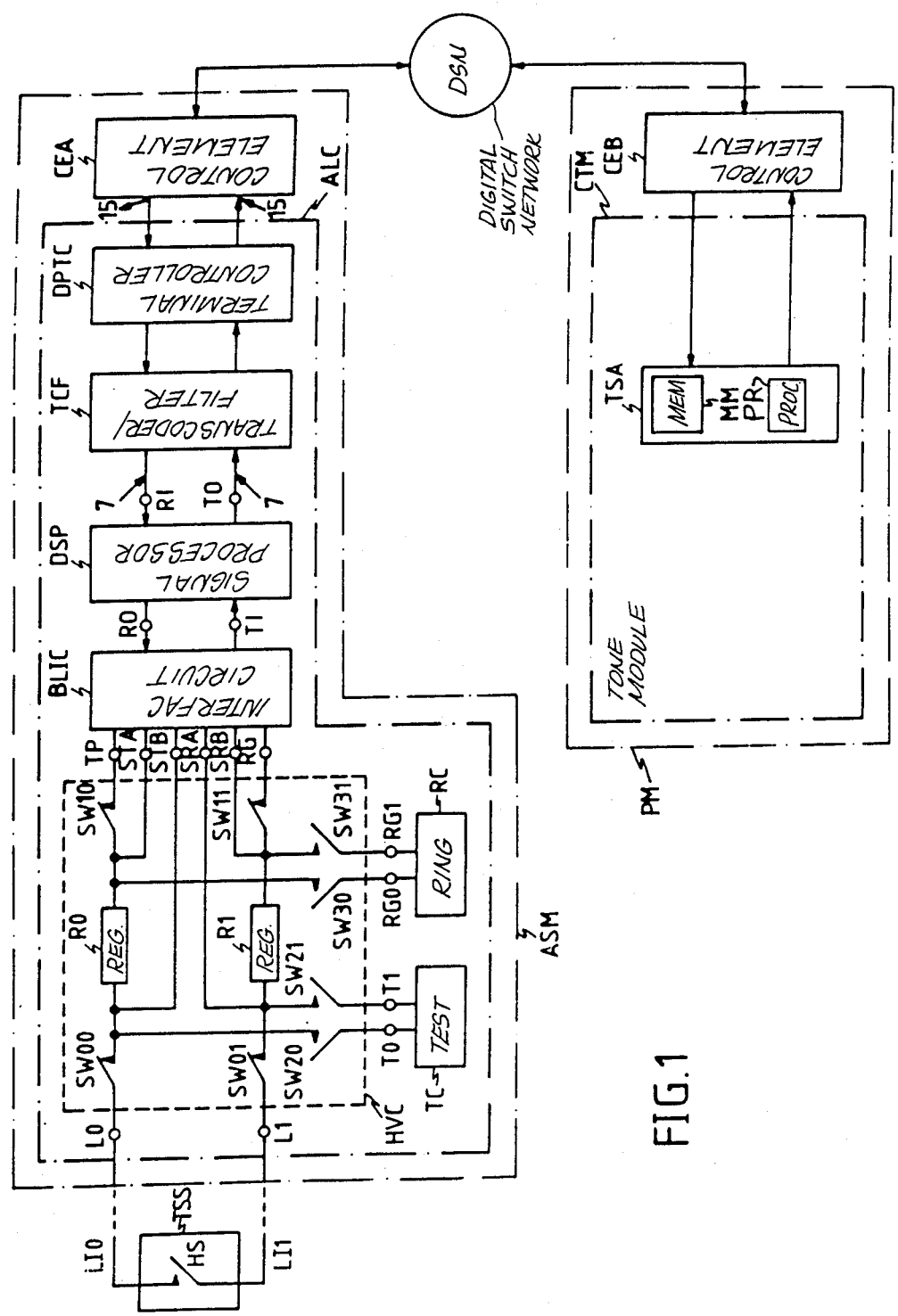
FIG. 1 shows part of a telecommunication system with a Digital Signal Processor DSP including an echo canceller according to the invention.

The part of a telecommunication system shown in FIG. 1 includes a Digital Switching Network DSN to which are coupled:
- an Analog Subscriber Module ASM including a Control Element CEA which is common for 16 Analog Line Controllers ALC of which only one is shown in relative detail; and
- a Processor Module PM including a Clock and Tone Module CTM and a second Control Element CEB.

Digital switching network DSN, analog subscriber module ASM and processor module PM are located in a digital telecommunication exchange and each analog line controller ALC is provided in common for 8 telecommunication lines such as the one shown which has conductors LI0 and LI1 connected to a telephone subset TSS.

Each such a controller ALC includes the cascade connection of a Dual Processor Terminal Controller DPTC, a TransCoder and Filter circuit TCF, a Digital Signal Processor DSP, a BIMOS subscriber Line Interface Circuit BLIC and an High Voltage switch Circuit HVC. The Dual Processor Terminal Controller DPTC is for instance of the type disclosed in the published European patent application No. 85200207.7-2202/0155030 (F. Van Simaeys et al corresponding to U.S. Pat. No. 4,688,211), the transcoder and filter TCF is of the type disclosed in the published European patent applications Nos. 84201344.3/0145038 (D. Rabaey et al) and 84201345.0/0145039 (D. Rabaey et al corresponding to U.S. Pat. No. 4,610,018), the Interface circuit BLIC is of the type disclosed in the published European patent application No. 85200774.9-2202/0201635 (J. Pieters et al corresponding to commonly assigned U.S. application Ser. No. 06/852,609) and the High Voltage switch Circuit HVC is of the type disclosed in the Belgian Pat. Nos. 897772 (G. Remmerie et al corresponding to commonly assigned U.S. application Ser. No. 06/732,789), 903101 (G. Remmerie et al), 902286 (G. Remmerie et al, and 902285 (G. Remmerie et al). Each pair of Dual Processor Terminal Controllers DPTC and Transcoder and Filter Circuit TCF is common for 8 sets of Digital Signal Processors DSP, Interface circuits BLIC and High Voltage switch Circuits HVC, the High Voltage switch Circuit HVC of each set being coupled to a telephone line. Each High Voltage switch Circuit HVC includes:

4 pairs of bidirectional switches SW00/SW01 to switches SW30/SW31;

line terminals L0 and L1 respectively connected to the line conductors LI0 and LI1;

test terminals T0 and T1 respectively connected to like named terminals of the Test Circuit TC;

ringing terminals RG0 and RG1 respectively connected to like named terminals of the Ringing Circuit RC;

tip and ring terminals TP and RG respectively connected to like named output terminals of the Interface circuit BLIC; and terminals STA, STB, SRA and SRB respectively connected to like named control terminals of the Interface circuit BLIC.

In High Voltage switch Circuit HVC, the line terminals L0/LI are connected to tip and ring terminals TP/RG via the series connections of switches SW00/SW01, 50 Ohms line feed resistors R0/R1 and switches SW10/SW11 respectively. The junction points STB and SRA of switch SW00 and resistor R0 and of switch SW01 and of resistor R1 are connected to terminals T0 and T1 of test circuit TC via switches SW20 and SW21 respectively, while the junction points STA and SRB of resistor R0 and switch SW10 and of resistor R1 and switch SWII are connected to terminals RG0 and RG1 of Ringing Circuit RC via switches SW30 and SW31 respectively. As shown for a switched through connection, series switches SW00, SW01, SW10 and SW11 are closed whereas the other shunt switches are open. All the switches are controlled by the Interface circuit BLIC so that High Voltage switch Circuit HVC is able to establish either one of the following connections:

between subset TSS and Interface circuit BLIC;
between subset TSS and test circuit TC;
between subset TSS and Ringing Circuit RC;
between Interface circuit BLIC and test circuit TC; and
between Interface circuit BLIC and Ringing Circuit RC.

The test circuit TC includes, among other circuits, a dummy network (not shown) used for simulating the subset TSS during echo cancellation measurements, thereby permitting such measurements to be made in the absence of any coordinated action by the subscriber (e.g., off-hooking his subset TSS). The function of the ringing circuit RC is to apply a ringing signal to the line LI0/LI1.

The subset TSS includes a normally open hook switch HS connected between the line conductors LI0 and LI1. The switch HS is closed when the subset TSS is off-hook.

The clock and tone module CTM forming part of Processor Module PM includes a Test Signal Analyzer TSA connected to the second control element CEB. Test Signal Analyzer TSA includes a memory MM storing data and software routines such as programs PROG1 and PROG4 and a processor PR to run these programs, as will be described later.

The digital signal processor DSP (shown in further detail in FIG. 2) has receive and transmit terminals RO and TI connected to like named terminals of the Interface circuit BLIC, and receive and transmit terminals RI and TO connected to like named terminals of the Transcoder and Filter Circuit TCF respectively. The Digital Signal Processor DSP is of the type described in detail in the above cited article "A 3-$\mu$m CMOS Digital Codec with Programmable Echo Cancellation and Gain Setting".

Figure 2:
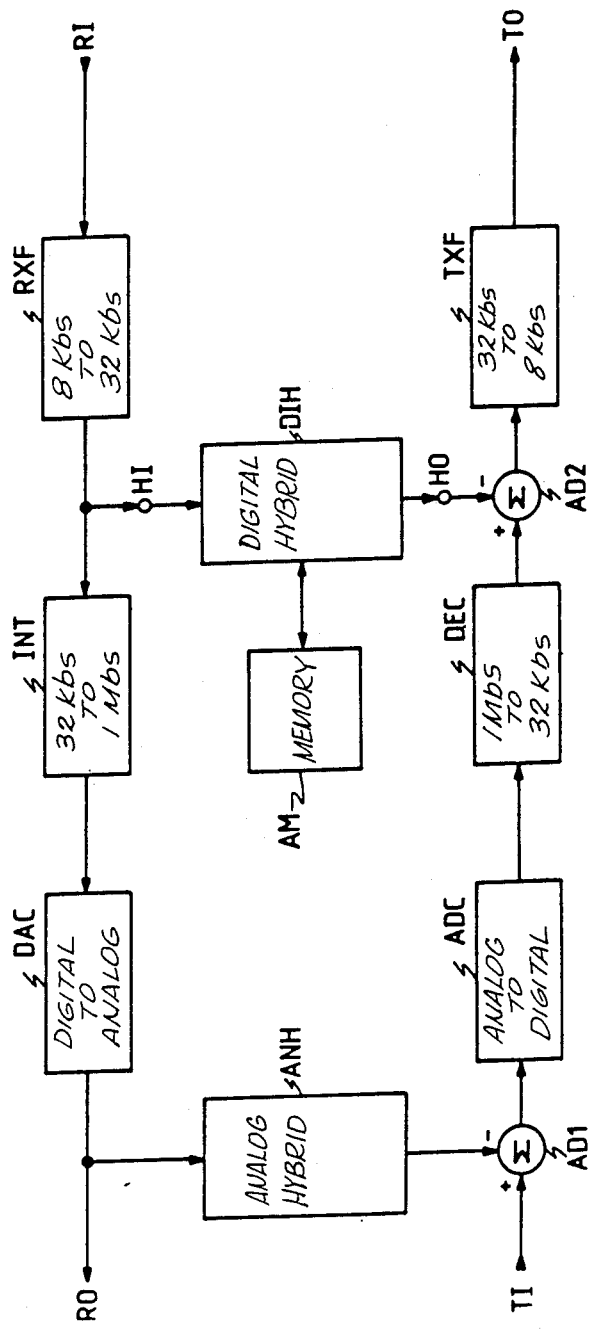
FIG. 2 represents the Digital Signal Processor DSP of FIG. 1 and the echo canceller DIH, AD2 in more detail.

Referring to FIG. 2, it may be seen that Digital Signal Processor DSP includes, between its receive terminals RI and RO, the cascade connection of:

a digital amplifier, interpolator and filter circuit RXF to convert 8 kilobit/second (kb/s) digital signals, received from Transcoder and Filter TCF on terminal RI and which are obtained by sampling, to 32 kb/s digital signals;

an interpolator INT to increase the bit rate of these signals to 1 Megabit/second; and a digital-to-analog converter DAC to convert these 1 Megabit/second digital signals to analog signals.

Between its transmit terminals TI and TO, Digital Signal Processor DSP includes the cascade connection of:

an analog subtracter AD1 whose adding input (+) is connected to TI and whose subtracting input (−) is connected to the output of an analog hybrid ANH the input of which is connected to terminal RO;

an analog-to-digital converter ADC to convert the analog signals received from the subset TSS to 1 Megabit/second digital signals;

a decimator DEC to reduce the frequency of these digital signals to 32 kb/s;

a second subtracter AD2 whose adding input (+) is connected to the output of decimator DEC and whose subtracting input (−) is connected to the output terminal HO of a digital hybrid DIH, the input terminal HI of which is connected between digital amplifier, interpolator and filter circuit RXF and interpolator INT; and a digital filter, decimator and amplifier circuit TXF to convert the 32 kb/s digital signals to 8 kb/s digital signals prior to sending them to Transcoder and Filter TCF.

The analog hybrid ANH is able to perform echo cancellation on analog signals transmitted to subset TSS via terminal RO and received back as echo signals in Digital Signal Processor DSP at terminal TI, while the purpose of the digital hybrid DIH is to cancel the excess of echo signals remaining after their passage through subtracter AD1. Digital hybrid DIH comprises a digital filter the coefficients of which are stored in an Auxiliary Memory AM which forms part of Digital Signal Processor DSP and is coupled to digital hybrid DIH.

Figure 3:
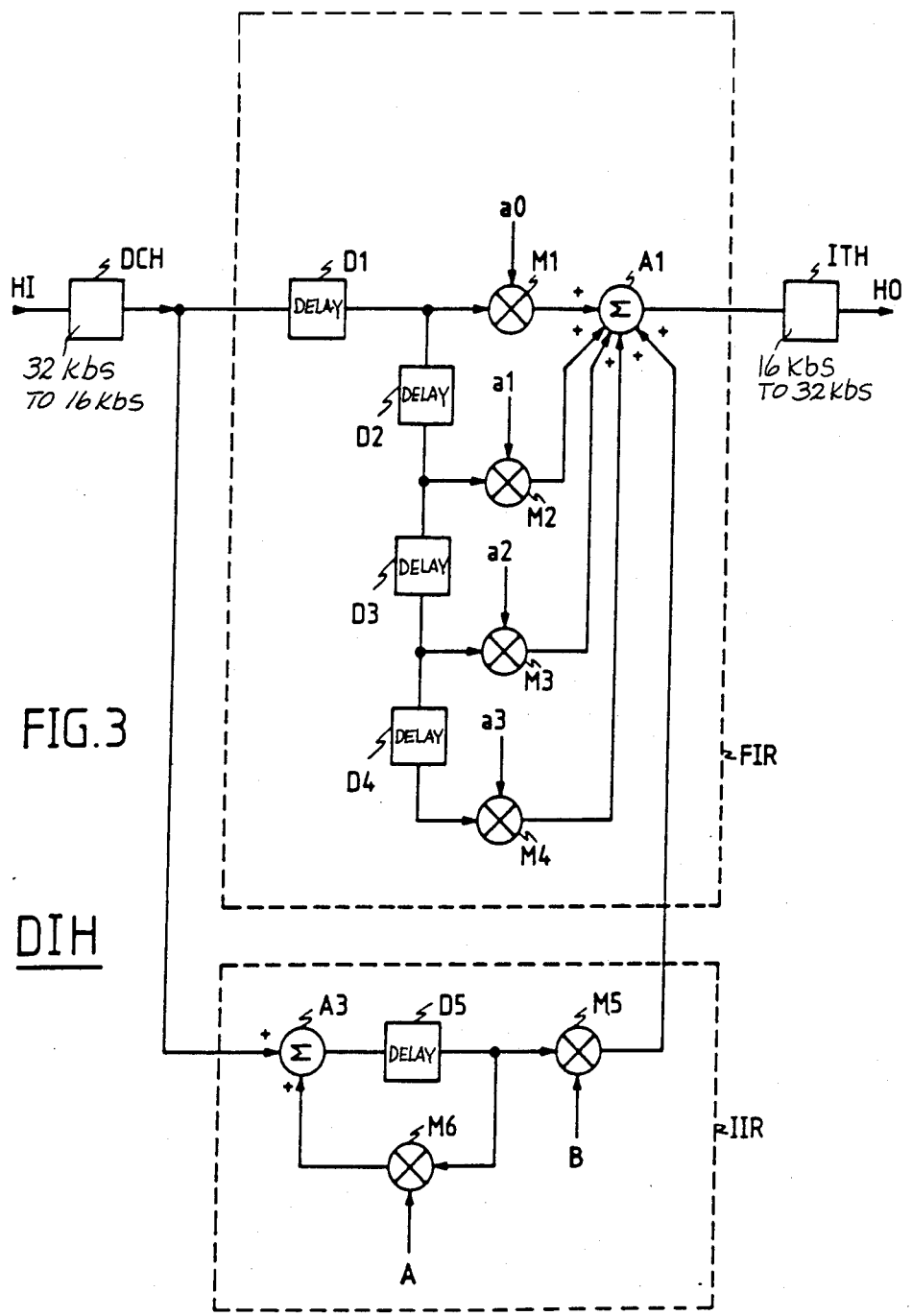
FIG. 3 shows the digital filter DIH included in the echo canceller DIH, AD2 of the Digital Signal Processor DSP of FIG. 2 in detail.

The digital hybrid DIH is shown in detail in FIG. 3. It includes a 4-tap Finite Impulse Response digital filter FIR which is connected in parallel with a first order Infinite Impulse Response digital filter IIR. More particularly, digital hybrid DIH includes between its terminals HI and HO the series connection of a delay and decimator circuit DCH, the filter FIR in parallel with the filter IIR, and an interpolator ITH. The delay and decimator circuit DCH reduces to 16 kb/s the bit rate of the 32 kb/s digital input signals at terminal HI by eliminating every second sample, while the interpolator ITH increases the bit rate of these signals again to 32 kb/s prior to supplying them to the subtracting input (−) of subtracter AD2 via terminal HO. This means that the filters FIR and IIR operate at 16 kb/s instead of at 32 kb/s, thereby simplifying their construction.

The 4-tap filter FIR includes the cascade connection of four delay circuits (each introducing a one sampling period delay) D1, D2, D3 and D4 whose junction points are connected to distinct adding inputs (+) of a multi-input adder A1 via respective multipliers M1 to M4. The filter coefficients a0, a1, a2 and a3 are applied to second inputs of multipliers M1, M2, M3 and M4 respectively. These coefficients each may have a value ranging between −2 and +2 and are stored in the auxiliary memory AM of the Digital Signal Processor DSP.

The first order filter IIR includes between decimator circuit DCH and a fifth adding input (+) of adder A1 (FIR) the series connection of an adder A3, a delay circuit of one sampling period D5, and a multiplier M5. A scaling factor or filter coefficient B is applied to a second input of multiplier M5 and the output of period D5 is fed back to a second adding input (+) of adder A3 via a multiplier M6. The coefficient B of the filter IIR may have a value ranging between 0 and +1 because only low-pass filter characteristics have to be generated. A coefficient A which is a pole of the filter IIR is applied to a second input of multiplier M6. These coefficients A and B are also stored in the auxiliary memory AM of the Digital Signal Processor DSP.

As is well known in the digital filter art, the value of the output signal $y_F$ of the filter FIR at a time kT may be written:

$$y_F[kT] = a0 \cdot x[(k-1)T] + a1 \cdot x[(k-2)T] + a2 \cdot x[(k-3)T] + a3 \cdot x[(k-4)T] \quad (1)$$

where $x[kT]$ is the value of an input sequence $x(t)$ at a discrete time kT;

$x[(k-n)T]$ is the value of $x[kT]$ delayed by a delay equal to nT;

with k = 0, 1, 2, 3, ...; and n = 1, 2, 3, 4, ...

Also, the value of the output signal $y_I$ of the filter IIR at a time kT may be written:

$$y_I[kT] = B \sum_{N=1}^{k} A^{N-1} \cdot x[(k-N)T] \quad (2)$$

where $x[(k-N)T]$ is the value of $x[kT]$ delayed by a delay equal to NT.

It should be noted that in a preferred embodiment, the input sequence $x(t)$ is a digitized and sampled version of an analog pulse signal which has a total duration of 4 milliseconds or 32 × 125 microseconds and a pulse duration of 125 microseconds, the sampling being performed during the same channel in every frame. The duration of a frame of a Time Division Multiplex (TDM) transmission is 125 microseconds, each frame comprising 32 channels. In practice, to increase the accuracy of the measurement, the analog pulse signal is for instance repeated 30 times and thus generates 30 analog output signals, of which only the 10 last signals are utilized to obtain a mean analog output signal. The sampled and digitized version of this mean analog output signal is an output sequence $y(t)$.

Because the filters FIR and IIR are connected in parallel, the global output signal may be written:

$$y[kT] = y_F[kT] + y_I[kT] \quad (3)$$

$$y[kT] = a0 \cdot x[(k-1)T] + a1 \cdot x[(k-2)T] + \quad (4)$$

$$a2 \cdot x[(k-3)]T + a3 \cdot x[(k-4)T] + B \sum_{N=1}^{k} A^{N-1} \cdot x[(k-N)T]$$

This means that the filter network FIR/IIR is able to suppress at any discrete time kT an echo signal which then has the value y[kT] and which is produced by an input signal x(t), provided that the values assigned to the filter coefficients are such that the relation (4) is satisfied. Indeed, the signal at the output terminal HO of digital hybrid DIH will then be an exact replica of the echo signal appearing at the output of the decimator DEC (FIG. 2); since these two signals are subtracted from each other in the digital subtracter AD2, no echo signal will then appear at the output of the latter subtracter AD2 and thus also no such echo signal will appear at the output of the Digital Signal Processor DSP.

At the initialization of the telecommunication system, a standard set of filter coefficients is loaded in the auxiliary memory AM of the Digital Signal Processor DSP. These coefficients are verified at regular time intervals by a maintenance procedure during which a loop is established between Test Signal Analyzer TSA and the test circuit TC by closing the switches SW10/SW11 and SW10/SW21 and by opening the switches SW00/SW01 and SW30/SW31.

Under the control of the program PROG1, a pulse sequence, e.g., as the one mentioned above, is then transmitted from Test Signal Analyzer TSA to test circuit TC and received back in Test Signal Analyzer TSA as a sampled echo signal. The transhybrid loss of digital hybrid DIH is checked by comparing the electric power of this echo signal with a predetermined power value stored in a memory (not shown) of the exchange. If the power of the received signal is less than the predetermined value, e.g., for a transhybrid loss of −30 dB, the coefficients of the filters FIR and IIR are considered to be satisfactory and are therefore not modified. In that is not the case, the filter coefficients have to be modified. This is then done automatically during the maintenance procedure which operates as described below by using the dummy network of the test circuit TC.

Also on complaints of the subscriber or on decision of the system supervisor the filter coefficients may be updated. In these cases, an operator starts manually the procedure to modify the filter coefficients.

Software programs PROG2 to PROG4 are executed during the modification procedure in order to determine a new set of filter coefficients a0 to a3 and B. It is to be noted that the coefficient A (which is a pole of the filter IIR) is not modified by these programs, primarily for stability reasons.

In principle, the 5 filter coefficients a0 to a3 and B may be determined in Test Signal Analyzer TSA by measuring the echo signal (i.e., output sequence y(t)) received back from subset TSS and to be compensated by the hybrid DIH, and by measuring the contribution of each of these filter coefficients to the value y[kT] of the replica of this echo signal which has to be produced by digital hybrid DIH at that moment, by measuring the factors x[(k−1)T], x[(k−2)T], etc., appearing in the above equation (4). By performing the latter measurements for 5 distinct values of k, the 5 filter coefficients may be calculated from 5 simultaneous equations, each derived from equation (4), but for a different value of k However, using Test Signal Analyzer TSA to thus measure the contribution of each of the filter coefficients to the replica of the echo signal is not very accurate because of the influence of noise introduced in the circuitry of the telecommunication system. For this reason, it is preferred to perform these measurements in the laboratory where the influence of the analog part can be inhibited by performing a separation at the chip level in order to isolate the digital hybrid and by measuring between the terminals RI and TO of the Digital Signal Processor DSP. It is to be noted that the contribution of the filter coefficients to the signal generated by digital hybrid DIH is invariable for all the chips of a same design so that these measurements in laboratory have to be performed only once. In that case, the delay introduced by the circuitry linking Test Signal Analyzer TSA to terminals RI and TO is neglected so that one does not exactly know which value y[kT] of y(t) is cancelled by the measured contributions. For this reason, the use of such laboratory measurements necessitates an additional measurement of the last mentioned delay.

For the above mentioned reasons, the following operations are performed under the control of the programs PROG2 to PROG4:

under the control of program PROG2 the contribution of each of the coefficients a0 to a3 and B to the output signal of digital hybrid DIH is measured only once in the laboratory between the terminals RI and TO coupled to digital hybrid DIH;

under the control of program PROG3 the delay produced by the circuitry connecting Test Signal Analyzer TSA to terminals RI, TO, and which has been neglected during the execution of program PROG2, is measured in Test Signal Analyzer TSA after a loop has been established between Test Signal Analyzer TSA and Digital Signal Processor DSP; and under the control of program PROG4 the real echo signal y(t) to be cancelled by digital hybrid DIH is measured in Test Signal Analyzer TSA after a loop has been established between Test Signal Analyzer TSA and subset TSS, and new filter coefficients a0 to a3 and B are calculated.

The programs PROG2 to PROG4 will now be considered in detail.

Program PROG2

After the digital hybrid DIH, the digital subtracter AD2 and the circuits RXF and TXF have been isolated from the other circuitry of the exchange, an above mentioned input sequence x(t) of which part of a sequence period is represented in FIG. 4(a) is applied to the terminal RI. The filter coefficient a0 is then made equal to 1 whereas the others are maintained at 0 so that by measuring the successive sample values then received on terminal TO and shown in FIG. 4(b) it is possible to measure the contribution of only the coefficient a0 to the successive sample values y[kT] (with k=0, 1, 2, ...) of the output signal y(t) of digital hybrid DIH. The other filter coefficients a1 to a3 and B are likewise each successively made equal to 1 while the remaining coefficients are then maintained at 0, and their thus-measured contributions to the output signal y(t) of digital hybrid DIH are represented in the FIGS. 4(c) to 4(f) respectively.

As follows from the above relation (4), the contributions of the filter coefficients a0 to a3 and B to the output signal y(t) of digital hybrid DIH and thus also to the cancelling of the value y[kT] of the identical echo signal y(t) at the moment kT are respectively:

$$x[(k - 1)T] \tag{5}$$

$$x[(k - 2)T] \tag{6}$$

$$x[(k - 3)T] \tag{7}$$

$$x[(k - 4)T] \tag{8}$$

$$\sum_{N=1}^{k} A^{N-1} \cdot x[(k - N)T] \tag{9}$$

Program PROG3

Under the control of this program, the above mentioned delay introduced by the circuitry linking Test Signal Analyzer TSA to the terminals RI and TO is measured. In this connection, it should be noted that because of the time division multiplex (TDM) transmission of the signals in the digital exchange, this delay depends essentially on the communication path established between Test Signal Analyzer TSA and Digital Signal Processor DSP.

Program PROG3 therefore calculates the transmission delay of the signals from Test Signal Analyzer TSA to Digital Signal Processor DSP for the same communication path as will be used during the execution of program PROG4. To provide a maximum transmission of the signals through the digital hybrid DIH, the filter coefficients a1 to a3 and B are set to 0, while coefficient a0 is set to its maximum value, i.e., 2. Then, the above mentioned input sequence x(t) partially shown in FIG. 4(a) is applied to digital hybrid DIH from Test Signal Analyzer TSA so that the signal or output sequence y(t) (not shown) received back in Test Signal Analyzer TSA is similar, except for the amplitude which is proportional to the value of coefficient a0, to that represented in FIG. 4(b) but delayed with respect to this signal. In Test Signal Analyzer TSA, the value of this delay is obtained by correlating both these signals, using means (not shown) well known in the art.

It is to be noted that this delay is always expressed by an integer number of discrete time intervals T, i.e., that k is an integer. This delay is for instance equal to 4T.

Program PROG4

The communication path established between Test Signal Analyzer TSA and Digital Signal Processor DSP for program PROG3 is maintained and extended to subset TSS, and an above mentioned input sequence x(t) is applied to subset TSS from Test Signal Analyzer TSA.

It is to be noted that during the execution of program PROG4, the cooperation of the subscriber, which has to off-hook his subset TSS in order to open the switch HS, is preferred to the dummy network of the test circuit TC because the measurement is then performed on the real subscriber line LI0/LI1.

During the execution of program PROG4, the coefficients a0 to a3 and B of digital hybrid DIH are all set to 0 so that no signal can pass through digital hybrid DIH and that the sample values received back in Test Signal Analyzer TSA are the sample values y[kT], with k=0, 1, 2, ..., of the echo signal y(t) to be compensated by digital hybrid DIH. These various sample values and the resulting echo signal are represented in FIG. 4(g).

The above delay determined by program PROG3, e.g., equal to 4T, means that the sample waveforms shown in the FIGS. 4(b) to 4(f) have to be shifted in time over a time interval equal to 4T in order that the values of the samples of y(t) shown in FIG. 4(g) should correspond to those of the factors multiplying coefficients a0 to a3 and B in the above relation (4). For instance, the contributions of the filter coefficients to the cancelling of the sample value G7 (for k=7) in FIG. 4(g) are B7 to F7 (for k=3) shown in FIGS. 4(b) to 4(f) respectively so that the equation (4) becomes:

$$G7 = a0 \cdot B7 + a1 \cdot C7 + a2 \cdot D7 + a3 \cdot E7 + B \cdot F7 \quad (10)$$

In the same way one may write four other similar equations, for instance, the equations linking the values G8 to G11 of y(t) to the corresponding values of the filter coefficient contributions, i.e.,:

$$G8 = a0 \cdot B8 + a1 \cdot C8 + a2 \cdot D8 + a3 \cdot E8 + B \cdot F8 \quad (11)$$

$$G9 = a0 \cdot B9 + a1 \cdot C9 + a2 \cdot D9 + a3 \cdot E9 + B \cdot F9 \quad (12)$$

$$G10 = a0 \cdot B10 + a1 \cdot C10 + a2 \cdot D10 + a3 \cdot E10 + B \cdot F10 \quad (13)$$

$$G11 = a0 \cdot B11 + a1 \cdot C11 + a2 \cdot D11 + a3 \cdot E11 + B \cdot F11 \quad (14)$$

From these 5 equations (10) to (14), program PROG4 may calculate the values of the filter coefficients as a0 to a3 and B. The new filter coefficients calculated by program PROG4 are then substituted for the old ones in the auxiliary memory AM of the Digital Signal Processor DSP mentioned above and program PROG1 is run again for verification.

If the new coefficients, calculated with subset TSS connected to the exchange, meet the requirements, a flag is set to prevent program PROG1 from verifying them again with respect to the dummy network of test circuit TC during a consecutive maintenance procedure and to report erroneous values of the echo response.

While the principles of the invention have been described above in connection with specific apparatus, it is to be clearly understood that this description is made only by way of example and not as a limitation on the scope of the invention. It should be appreciated by those skilled in the art that many modifications and variations are possible. Accordingly the exclusive rights afforded hereby should be broadly construed, limited only by the spirit and scope of the appended claims.

What is claimed is:

1. An echo canceller including an echo canceller circuit adapted to be coupled between a receive path and a transmit path in a communications system, said echo canceller comprising
    a digital filter responsive to a digital input signal for producing a replica signal comprising a plurality of digitized replica samples,
    said digital filter having an associated plurality of filter coefficients,
    said digital input signal comprising a plurality of digitized input samples applied to said receive path,
    each digitized sample of said replica signal being equal to the sum of a plurality of terms, each term being equal to the product of a respective one of said filter coefficients and of a respective factor which is a function of said digital input signal,
    a subtracter circuit, responsive to said replica signal and to the output signal which appears on said transmit path in response to said input signal being applied to said receive path, for subtracting said replica signal from said output signal,
    first processing means for first determining each of said respective factors from replica signal samples which are output by the digital filter when all the filter coefficients, except the filter coefficient by which said each factor is multiplied, are equal to zero, and
    second processing means responsive to the factors determined by said first processing means for thereafter determining said filter coefficients from a plurality of output signal samples.

2. An echo canceller according to claim 1, wherein said first processing means applies a predetermined input signal to said receive path, successively setting the respective filter coefficient corresponding to a respective said each factor equal to a predetermined non-zero value, and
    said plurality of output signal samples is equal in number to the number of said filter coefficients.

3. An echo canceller according to claim 1, wherein said second processing means
    applies an input signal to said receive path, and sets all said filter coefficients equal to zero.

4. An echo canceller according to claim 1, wherein said first and second processing means are provided at respective first and second locations within said communication system, and
    said second means determines the delay to which a signal is subjected when flowing between said first and second locations and uses the delay thus determined to correlate a particular output signal sample with its corresponding filter coefficient factor.

5. An echo canceller according to claim 4, wherein said communications system includes a plurality of analog subscriber modules each including a respective said digital filter, a single said second processing means measures said particular output signal samples for a plurality of subscriber modules each having a different said receive path and a different said transmit path and said single said second processing means is located at a single common location that is a part of and is connected to said communications system but that is remote from at least some of said analog subscriber modules.

6. An echo canceller according to claim 5, wherein said single second processing means is coupled to each of said analog subscriber modules via a time division multiplex communication path.

7. An echo canceller according to claim 1, wherein said first and second processing means are both located in the immediate vicinity of said receive and transmit paths.

8. An echo canceller according to claim 5, wherein said output signal samples are measured by said second processing means after said digital filters have been installed in the communications system and said replica signal factors are measured by said first processing means using a representative one of said digital filters that has not yet been so installed in the communications system.

9. An echo canceller according to claim 2, wherein said second processing means determines said plurality of filter coefficients by solving a same number of mathematical relations each linking a distinct output signal sample to a corresponding replica signal sample.

10. An echo canceller according to claim 1, wherein said input signal is a digitized and sampled version of an analog pulse sequence.

* * * * *